United States Patent
Zwerger et al.

(10) Patent No.: US 11,193,576 B2
(45) Date of Patent: Dec. 7, 2021

(54) OILWAY ARRANGEMENT FOR A TRANSMISSION HOUSING

(71) Applicant: ZF Friedrichshafen AG, Friedrichshafen (DE)

(72) Inventors: Niko Zwerger, Friedrichshafen (DE); Philipp Notheis, Salem-Mimmenhausen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 546 days.

(21) Appl. No.: 16/196,657

(22) Filed: Nov. 20, 2018

(65) Prior Publication Data

US 2019/0154136 A1    May 23, 2019

(30) Foreign Application Priority Data

Nov. 23, 2017   (DE) ...................... 10 2017 220 989.5

(51) Int. Cl.
*F16H 57/04*    (2010.01)

(52) U.S. Cl.
CPC ......... *F16H 57/0423* (2013.01); *F16H 57/04* (2013.01); *F16H 57/0457* (2013.01); *F16N 2210/04* (2013.01); *F16N 2210/12* (2013.01)

(58) Field of Classification Search
CPC ................ F16H 57/0423; F16H 57/04; F16N 2210/04–12
See application file for complete search history.

(56) References Cited

U.S. PATENT DOCUMENTS

| | | | | |
|---|---|---|---|---|
| 4,987,974 A * | 1/1991 | Crouch | ................ | F16H 57/043 184/11.1 |
| 5,404,964 A * | 4/1995 | Zinsmeyer | .............. | F04D 25/02 184/13.1 |
| 5,699,877 A * | 12/1997 | Dreier | ...................... | F16N 7/26 184/11.1 |
| 10,781,718 B1 * | 9/2020 | Anglin | ...................... | F02C 7/28 |
| 2013/0098585 A1 * | 4/2013 | Franzen | ................ | H02K 9/193 165/104.31 |
| 2013/0214492 A1 * | 8/2013 | Nielsen | ................ | F01D 25/186 277/347 |
| 2013/0303323 A1 * | 11/2013 | Zink | .................... | F16H 57/029 475/160 |
| 2014/0029883 A1 * | 1/2014 | Sanaka | .............. | B60B 27/0073 384/486 |
| 2014/0346850 A1 * | 11/2014 | Shibata | .................. | F16J 15/324 301/109 |
| 2018/0128366 A1 * | 5/2018 | Weng | .................. | F16H 57/0456 |
| 2018/0223983 A1 * | 8/2018 | Tamura | ................ | F16H 57/021 |

(Continued)

*Primary Examiner* — Henry Y Liu
*Assistant Examiner* — Mark K Buse
(74) *Attorney, Agent, or Firm* — Dority & Manning, P.A.

(57) ABSTRACT

An oil guidance arrangement for a transmission housing (1) of a vehicle includes at least one annular oil slinger (2) for collecting radially outward flowing oil. A guide area (3) for generating a laminar oil flow is closed in sections and is provided on a circumferential area of the oil slinger (2). A transmission housing (1) includes the oil guidance arrangement. The oil slinger (2) of the oil guidance arrangement is attached to a transmission housing-side centering plate (10) and surrounds a clutch (6). By rotation of the clutch (6), oil is guidable radially outward to the guide area (3) of the oil slinger (2).

9 Claims, 5 Drawing Sheets

(56) References Cited

U.S. PATENT DOCUMENTS

2019/0107154 A1* 4/2019 Ishida .................... F16C 19/543
2019/0113080 A1* 4/2019 Kamiya ................. F16C 33/805
2020/0096089 A1* 3/2020 Hashimoto ......... F16H 57/0486
2020/0096112 A1* 3/2020 Ito ........................ F16J 15/3204

* cited by examiner

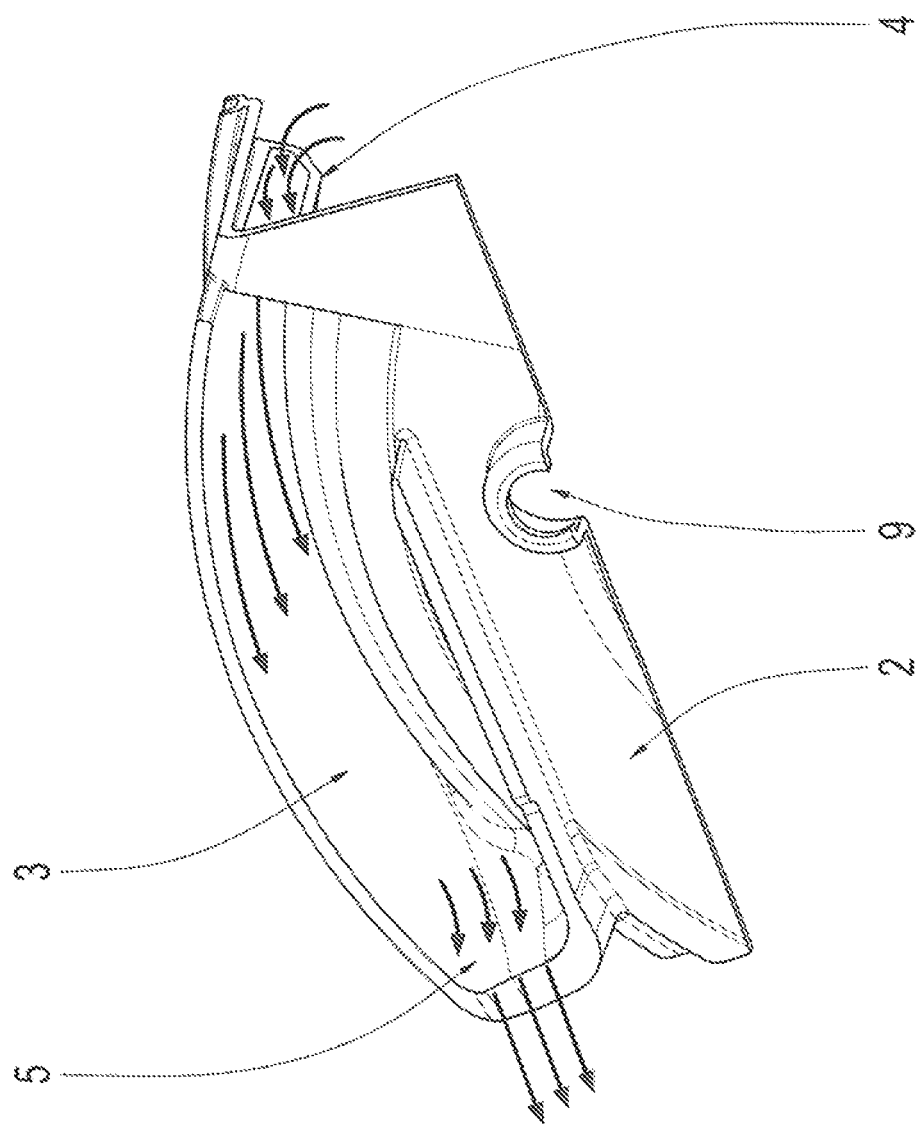

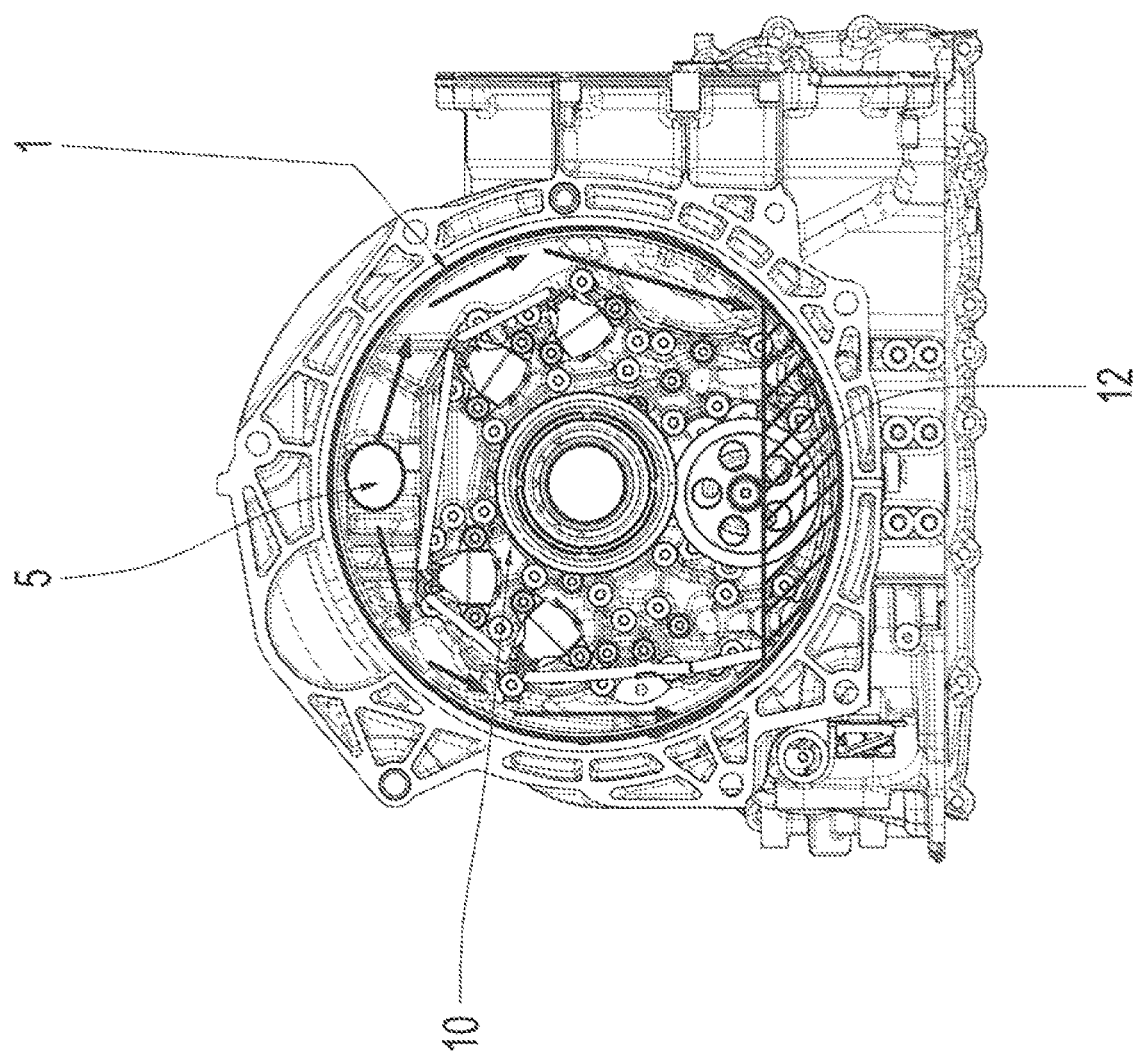

OILWAY ARRANGEMENT FOR A TRANSMISSION HOUSING

FIELD OF THE INVENTION

The present invention relates generally to an oil guidance arrangement for a transmission housing of a vehicle, including at least one annular oil slinger for collecting radially outward flowing oil. The present invention further relates generally to a transmission housing including the oil guidance arrangement.

BACKGROUND

Oil guidance arrangements with an oil slinger for a transmission housing of a vehicle are known. The known oil guidance arrangements usually include an oil slinger having a form of a partial circle or even having a form of a full circle in order to collect the oil in the interior space of the transmission housing and return the oil into an oil sump of the transmission housing. In the transmission housing, oil is conveyed radially outward from a radial gap between a clutch and the oil slinger in order to reduce drag losses in the clutch. Due to the high rotational speeds, the radially outward flowing oil hits the oil slinger at high speed and axially exits the oil slinger into the interior space of the transmission housing to be discharged into the pump sump. In so doing, the oil foams up due to the turbulence. The foamed oil then flows into the oil sump of the transmission housing and, there, is scavenged or collected by the pump.

It has been shown that the foamed oil can result in cavitations and pressure drops in the oil pump, which results, on the one hand, in damage and, on the other hand, in a reduction of the shift quality of the transmission.

SUMMARY OF THE INVENTION

Example aspects of the present invention provide an oil guidance arrangement for a transmission housing and a transmission housing including the oil guidance arrangement of the types described at the outset, in which turbulence in the oil guidance can be avoided to the greatest extent possible.

Therefore, an oil guidance arrangement for a transmission housing of a vehicle is provided, which includes at least one approximately annular or annular disk-shaped oil slinger for collecting radially outward flowing oil. In order to avoid turbulence and, therefore, damage and pressure drops in the oil flow, it is provided that a guide area for generating a laminar oil flow, which is at least in part closed and includes at least one inflow opening and at least one outflow opening, is provided on the circumferential area of the oil slinger.

In this way, the oil flow is kept laminar at least between the inflow opening and the outflow opening due to the utilization of the guide area according to example aspects of the invention, and so spurious foaming of the oil is prevented or reduced to a minimum.

A particularly effective measure for generating a laminar oil flow is achieved, according to example aspects of the invention, by way of the fact that the guide area has a turbine blade geometry for oil guidance in the circumferential direction and in the tangential flow direction. Therefore, the inner wall of the closed guide area resembles a turbine blade geometry in the tangential direction. The term "turbine blade geometry" is understood to mean the geometry turned in the radial direction of a turbine blade. Due to the guide geometry provided along the guide area in the tangential direction, the oil entering the guide area is guided in such a way that a practically laminar oil flow through the guide area is achieved.

According to a next refinement of the present invention, it is provided that a radially directed oil flow flows in through the inflow opening of the guide area and can be diverted by the guide area into a tangentially aligned oil flow which flows out of the outflow opening of the guide area as an axially aligned oil flow. Due to the fact that the oil flow flows along the turbine blade geometry in the guide area, the initially radially aligned oil flow is converted into a tangential flow and, on the outflow side, into an axial flow. As a result, the occurrence of turbulence is prevented.

With respect to the circumferential area of the oil slinger, it can be provided, within the scope of a preferred variant embodiment, that the guide area on the circumferential area of the oil slinger extends along a circumferential angle of approximately thirty degrees (30°). As a result, the structural outlay is reduced to a minimum while the effect is maximal, wherein other values for the circumferential angle are also possible, however, depending on the application.

A secondary aspect of the invention is based on also providing a transmission housing including an oil guidance arrangement according to example aspects of the invention, wherein the oil slinger of the oil guidance arrangement is attached to a transmission housing-side centering plate and radially surrounds or encloses a clutch, wherein oil can be guided radially outward to the guide area of the oil slinger via the rotation of the clutch, whereby the above-described and further advantages result.

BRIEF DESCRIPTION OF THE DRAWINGS

The present invention is explained in greater detail in the following with reference to the drawings. In the drawings:

FIG. 4 shows an enlarged part view of the oil slinger including a guide area for the laminar oil flow guidance;

FIG. 9 shows one further axial section of the transmission housing including the outflow-side guide area of the oil slinger.

DETAILED DESCRIPTION

Figure 3:
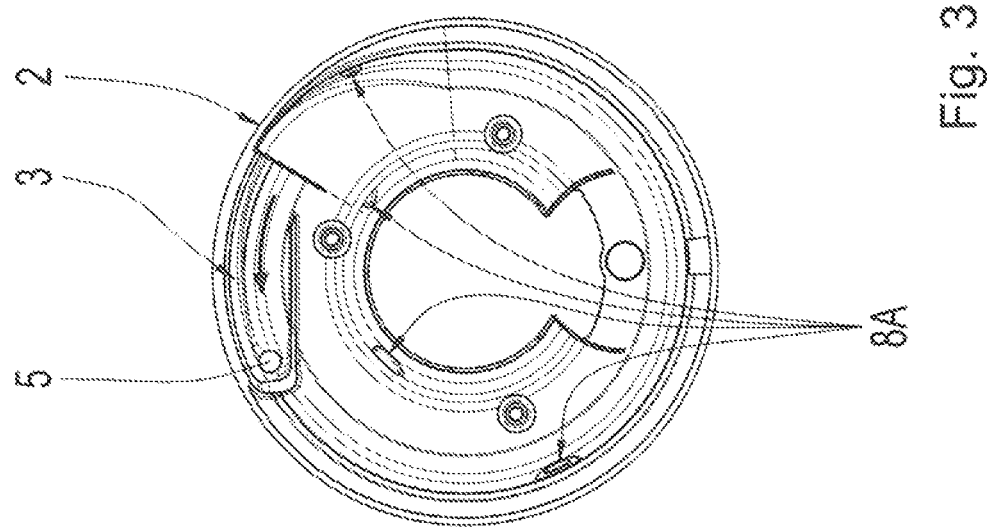
FIG. 3 shows a schematic rear view of the oil guidance arrangement.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

In FIGS. 1 through 4, various views of an oil guidance arrangement according to example aspects of the invention are represented by way of example, while various views of a transmission housing 1 including the installed oil guidance arrangement are shown by way of example in FIGS. 5 through 9.

The oil guidance arrangement according to the invention includes an approximately annular disk-shaped oil slinger 2 for collecting radially outward flowing oil. In order to avoid turbulence during the oil flow guidance, it is provided that a guide area 3 for generating a laminar oil flow, which is closed in sections or in part, is provided on the circumferential area of the oil slinger 2.

The guide area 3 of the oil slinger 2 has a turbine blade geometry for laminar oil flow guidance which is indicated by way of example in FIG. 4 by flow arrows provided along the turbine blade geometry turning in the tangential direction between an inflow opening 4 and an outflow opening 5 of the guide area 3. The inflow opening 4 of the guide area 3 is utilized for the radially inflowing oil flow, while assigned to the outflow opening 5 of the guide area 3 is the axially outflowing oil flow for returning oil into an oil sump 12 of the transmission housing 1.

Figure 1:
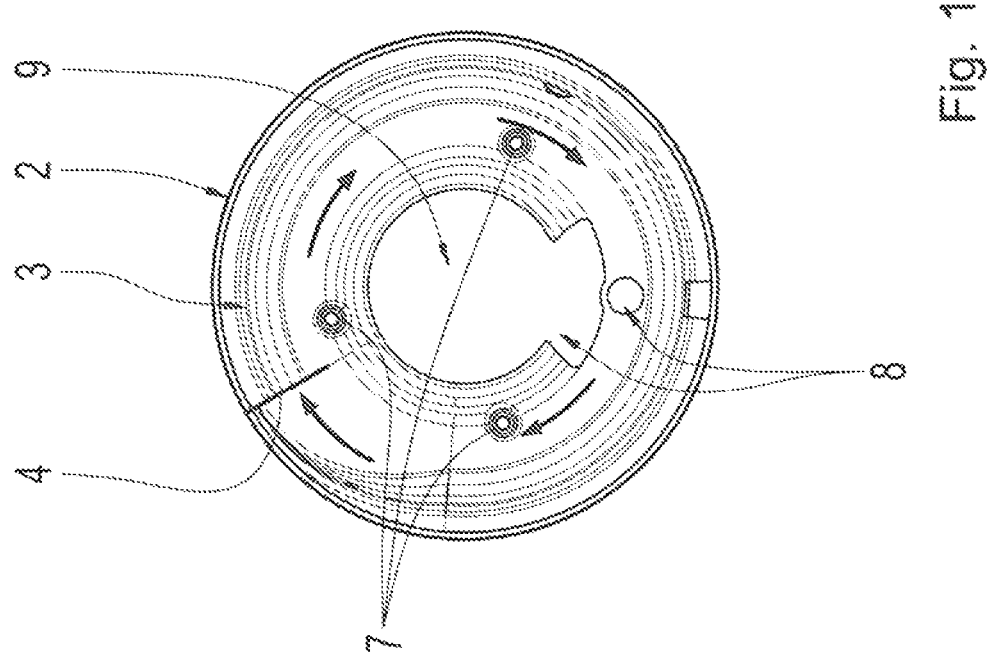
FIG. 1 shows a schematic top view of one possible variant embodiment of an oil guidance arrangement including an oil slinger for a transmission housing.
Figure 5:
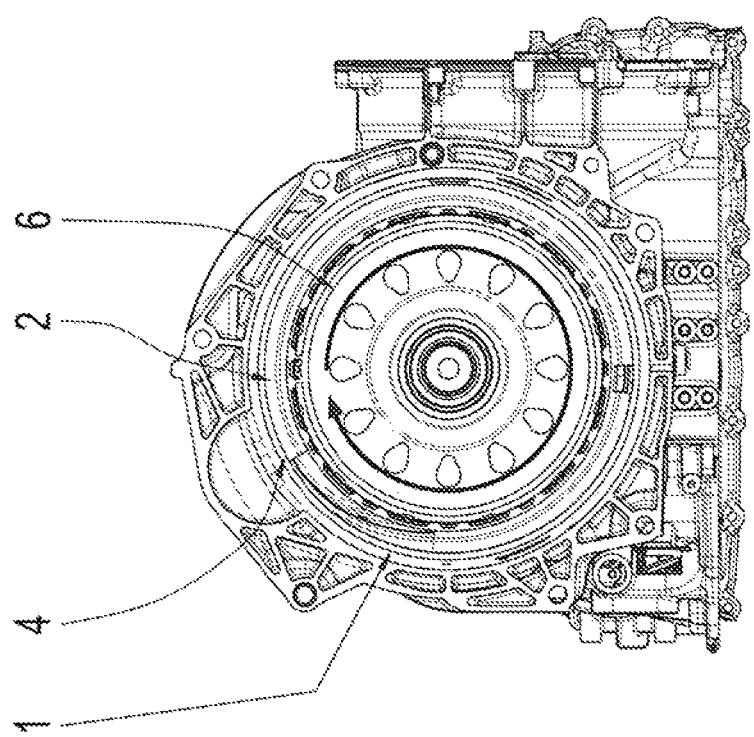
FIG. 5 shows an axial section of a transmission housing according to example aspects of the invention, including an oil guidance arrangement and including a clutch filled with oil.
Figure 6:
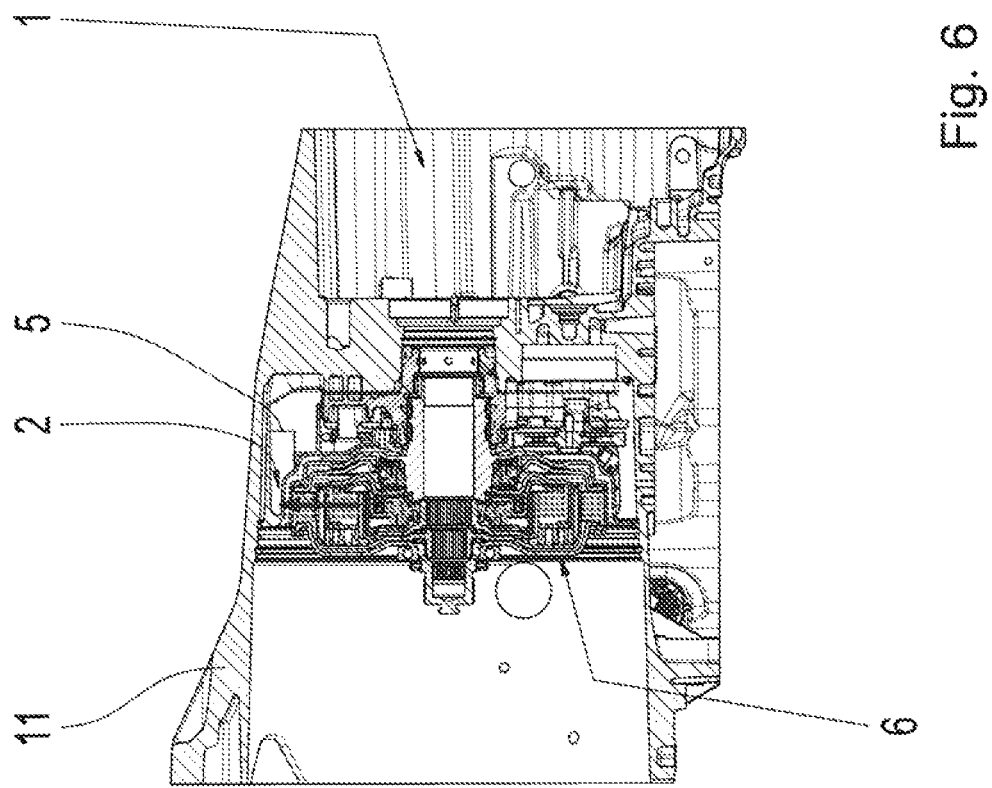
FIG. 6 shows a longitudinal section of the transmission housing including the oil guidance arrangement and including oil flowing radially outward from the clutch.

A top view of the oil slinger 2 of the oil guidance arrangement is represented on the inflow side in FIG. 1, wherein an oil flow generated by way of a rotation of a component, such as a clutch 6, is represented, the oil flow being guided into the inflow opening 4 of the guide area 3. Multiple attachment sections are provided on the oil slinger 2 across the circumferential area, as bolt-on domes 7, for facilitating attachment on the transmission-housing side. In addition, multiple open spaces 8 are provided on the oil slinger 2, for example, for a pump drive gear or the like.

Figure 2:
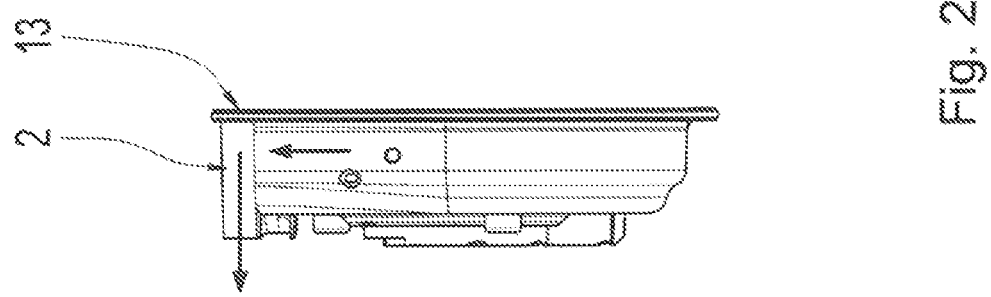
FIG. 2 shows a schematic side view of the oil guidance arrangement.

In FIG. 2, a side view of the oil slinger 2 of the oil guidance arrangement is represented, by way of which a radial seal 13 of the transmission housing 1 is indicated. Furthermore, flow arrows for the oil flow guided along the guide area 3 are indicated.

A back view of the oil slinger 2 of the oil guidance arrangement is represented in FIG. 3. The outflow opening 5 of the guide area 3 having the turbine blade geometry is indicated in this view. The oil flow emerges axially from the plane of the drawing, from the outflow opening 5 or the outlet of the guide area 3, which is indicated by a circle in FIG. 3. In addition, further open spaces 8A for constrictions forming on the oil slinger 2 are indicated. Furthermore, a central recess 9 is provided in the oil slinger 2 for the passage of a shaft extending in the transmission housing 1.

A partial view of the oil slinger 2 including the guide area 3 is shown in detail in FIG. 4. The indicated flow arrows clearly show that the oil flow enters the inflow opening 4 initially directed radially and is tangentially aligned in the circumferential direction along the guide area 3 due to the turbine blade geometry turning in the circumferential direction, in order to finally flow out of the outflow opening 5 of the guide area 3 as an axial oil flow. As a result, it is ensured that a nearly laminar oil flow is ensured, and so turbulence is avoided to the greatest extent possible.

An example of an installation of the oil guidance arrangement according to example aspects of the invention in the transmission housing 1 is represented in FIGS. 5 through 9. The oil slinger 2 of the oil guidance arrangement is attached to a centering plate 10 of a clutch bell housing 11 of the transmission housing 1 and surrounds the clutch 6 which is rotatably mounted in the clutch bell housing 11 and can be designed, for example, as a dual clutch. Due to the rotation of the clutch 6, the oil provided in the interior of the clutch 6 is conveyed radially outward to the circumferential area of the oil slinger 2 into the guide area 3, which is indicated by corresponding flow arrows in FIGS. 5 and 6.

Figure 7:
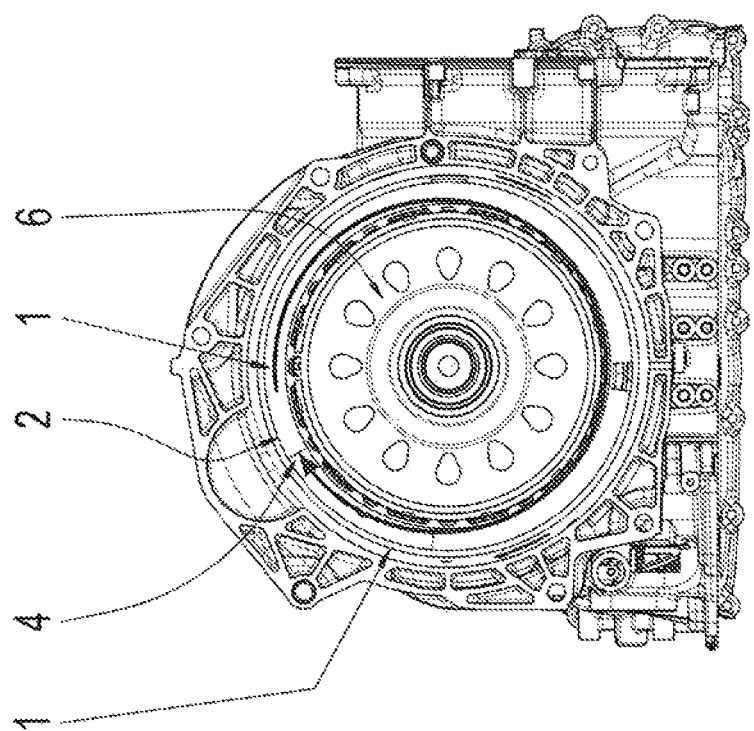
FIG. 7 shows one further axial section of the transmission housing including oil which is flowing into the guide area of the oil slinger due to the rotation of the clutch.
Figure 8:
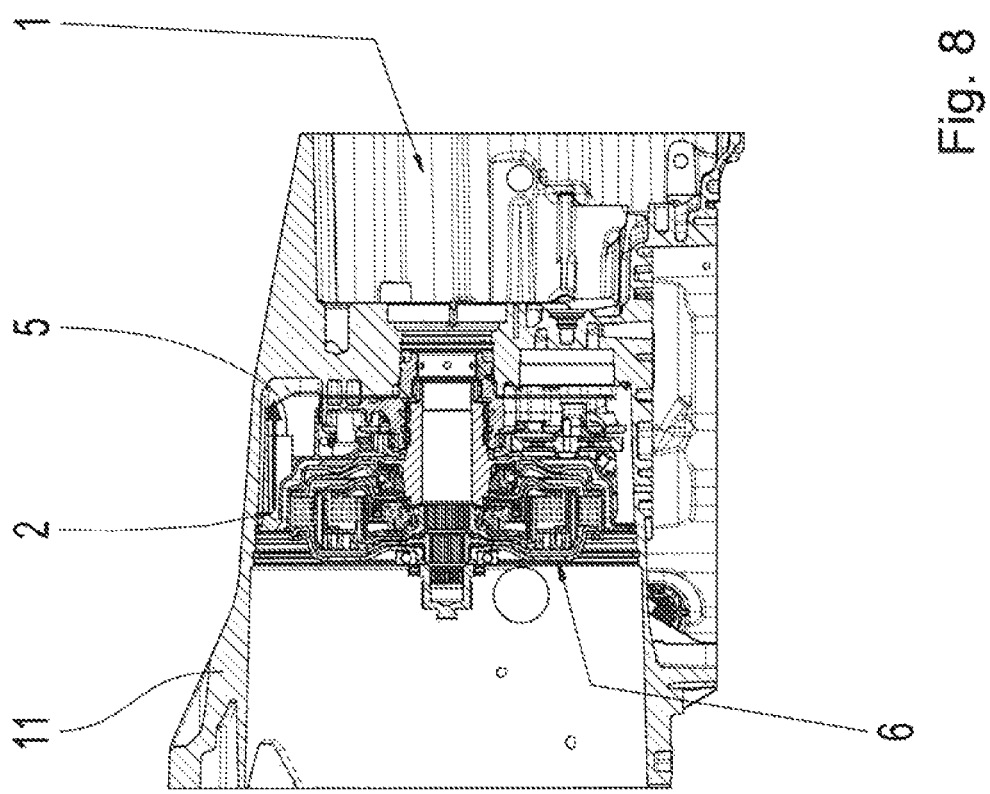
FIG. 8 shows one further longitudinal section of the transmission housing including oil flowing axially out of the guide area of the oil slinger.

FIG. 7 shows one further axial section of the transmission housing 1 including the installed oil slinger 2. Due to the rotation of the clutch 6, the oil is conveyed from a gap between the clutch 6 and the oil slinger 2 toward the inflow opening 4 of the guide area 3 of the oil slinger 2.

Thereafter, the oil is conveyed in the axial direction via the turbine blade-shaped outflow opening 5 in the guide area 3 outward into the interior space of the transmission housing 1 without foaming up. This is indicated by way of a corresponding flow arrow in the longitudinal section of the transmission housing 1 represented in FIG. 8.

FIG. 9 shows one further axial section of the transmission housing 1 on the outflow side of the oil slinger 2, including the oil flow flowing axially out of the guide area 3 of the oil slinger 2, which is indicated in FIG. 9 by a circle in the area of the outflow opening 5. The oil emerging from the outflow opening 5 runs downward between the clutch bell housing 11 and the centering plate 10 along the longest possible path in order to stabilize the oil to the greatest extent possible before the oil enters the oil sump 12 of the transmission housing 1 and is scavenged of circulated again by the oil pump.

Modifications and variations can be made to the embodiments illustrated or described herein without departing from the scope and spirit of the invention as set forth in the appended claims.

REFERENCE CHARACTERS 1 transmission housing
2 oil slinger
3 guide area
4 inflow opening
5 outflow opening
6 clutch
7 bolt-on dome
8, 8A open space
9 central recess
10 centering plate
11 clutch bell housing
12 oil sump
13 radial seal

The invention claimed is:

1. An oil guidance arrangement for a transmission housing (1) of a vehicle, comprising at least one annular disk-shaped oil slinger (2) for collecting radially outward flowing oil, wherein the oil slinger (2) has a guide area (3) for generating a laminar oil flow, the guide area (3) closed in sections and having at least one inflow opening (4) and at least one outflow opening (5), the guide area (3) provided on a circumferential area of the oil slinger (2).

2. The oil guidance arrangement of claim 1, wherein the guide area (3) has a turbine blade geometry in a circumferential direction for oil guidance.

3. The oil guidance arrangement of claim 1, wherein the guide area (3) is configured such that a radially directed oil flow enters into the guide area (3) through the inflow opening (4), the oil in the guide area (3) is tangentially diverted by the guide area (3), and an axially aligned oil flow exits the guide area (3) through the outflow opening (5).

4. The oil guidance arrangement of claim 1, wherein the guide area (3) on the circumferential area of the oil slinger (2) extends along a circumferential angle of approximately thirty degrees.

5. The oil guidance arrangement of claim 1, wherein the oil slinger (2) comprises a plurality of attachment sections across the circumferential area, the plurality of attachment sections configured for attachment on the transmission housing (1) to mount the oil slinger (2) to the transmission housing (1).

6. The oil guidance arrangement of claim 1, wherein the oil slinger (2) defines a central recess (9), the central recess (9) configured for receipt of a shaft within the transmission housing (1).

7. A transmission housing, comprising the oil guidance arrangement of claim 1, wherein the oil slinger (2) of the oil guidance arrangement is attached to a transmission housing-side centering plate (10) and radially surrounds a clutch (6) such that rotation of the clutch (6) guides oil radially outward to the guide area (3) of the oil slinger (2).

8. The transmission housing of claim 7, wherein the inflow opening (4) of the guide area (3) of the oil slinger (2) is radially aligned with the clutch (6).

9. The transmission housing of claim 7, wherein the outflow opening (5) in the guide area (3) of the oil slinger (2) is directed axially towards an interior space of the transmission housing (1).

* * * * *